O. L. ENGSTROM AND H. C. NELSON.
VISE.
APPLICATION FILED MAY 23, 1921.

1,392,130.

Patented Sept. 27, 1921.
2 SHEETS—SHEET 1.

O. L. Engstrom,
H. C. Nelson,
INVENTOR.

BY Geo. P. Kimmel
ATTORNEY.

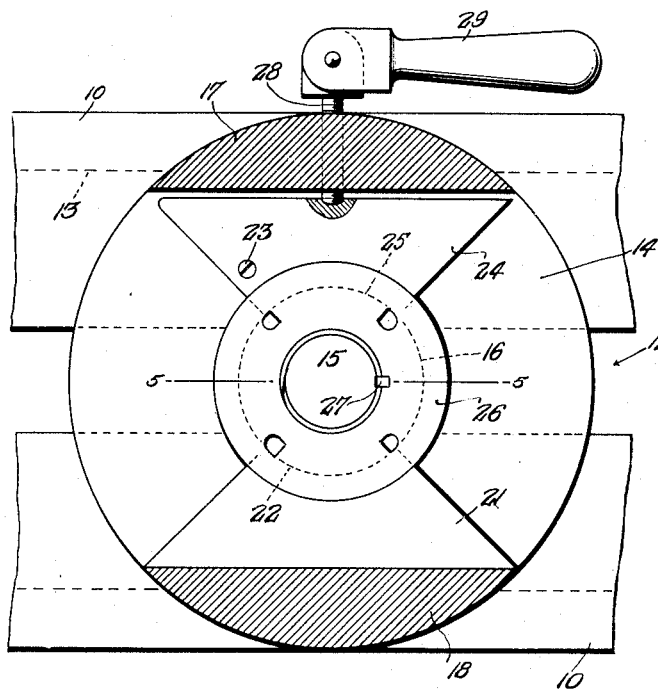
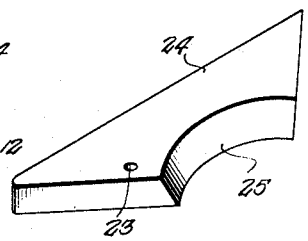
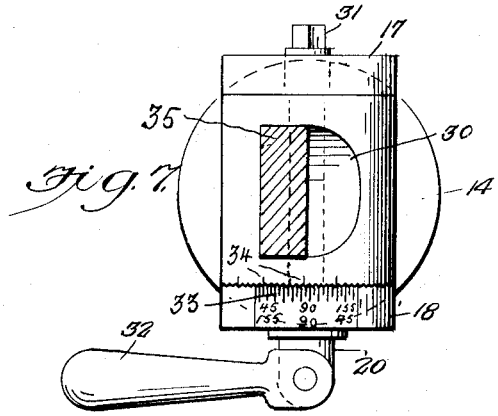

UNITED STATES PATENT OFFICE.

OTTO L. ENGSTROM AND HERMAN C. NELSON, OF SOUTH BEND, INDIANA.

VISE.

1,392,130.   Specification of Letters Patent.   Patented Sept. 27, 1921.

Application filed May 23, 1921. Serial No. 471,742.

*To all whom it may concern:*

Be it known that we, OTTO L. ENGSTROM and HERMAN C. NELSON, citizens of the United States, residing at South Bend, in the county of St. Joseph and State of Indiana, have invented certain new and useful Improvements in Vises, of which the following is a specification.

This invention relates to improvements in vises, and has for one of its objects to produce a device of this character having means whereby the portion of the vise which carries the gripping jaws may be adjusted to hold an article between the jaws at any desired angle and to clamp the parts in adjusted position.

Another object of the invention is to provide a device of this character having means whereby the degree of inclination or the angularity of the gripping jaws may be accurately determined.

With these and other objects in view the invention consists in certain novel features of construction as hereinafter shown and described and then specifically pointed out in the claims, and in the drawings illustrative of the preferred embodiment of the invention.

Fig. 3 is a vertical section on the line 3—3 of Fig. 1.

Fig. 4 is a transverse section, enlarged, on the line 4—4 of Fig. 3.

Fig. 5 is a sectional detail, enlarged, illustrating the construction of the clamping device between the supporting base and vise structure.

Fig. 6 is a detached perspective view, enlarged, of the movable member of the clamping device between the supporting base and vise structure.

Fig. 7 is a plan view of the lower portion of the device with the support for the upper part of the device in section on the line 7—7 of Fig. 1.

Figure 1:
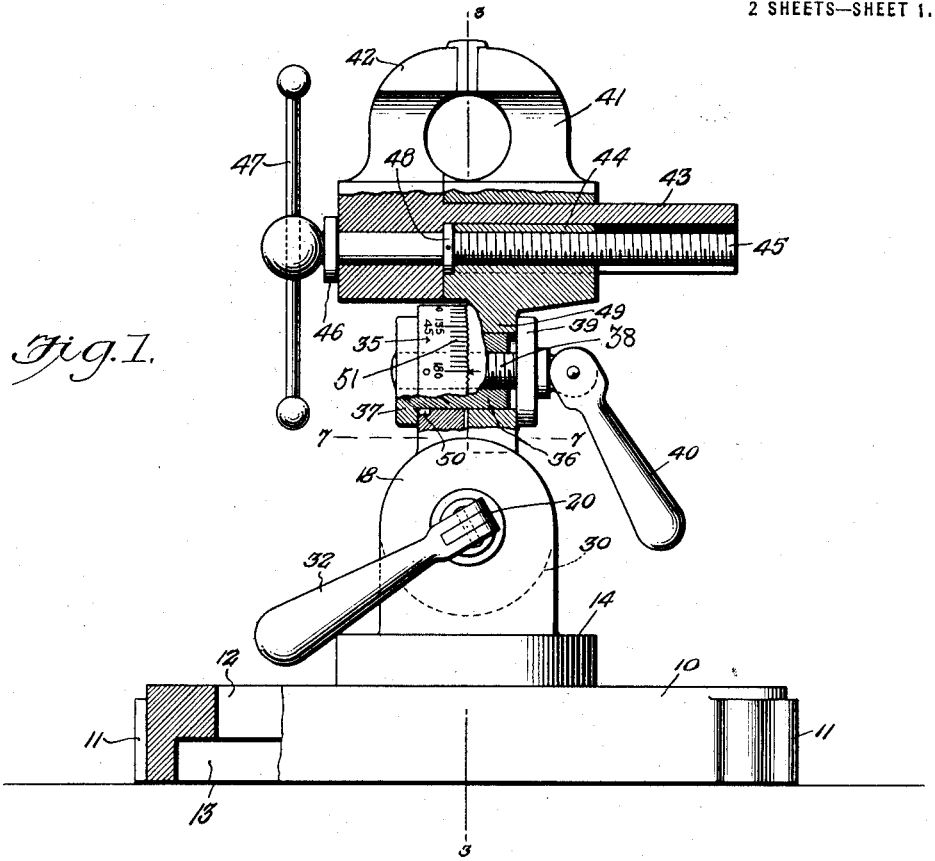
Figure 1 is a side elevation partly in section of the improved device.
Figure 2:
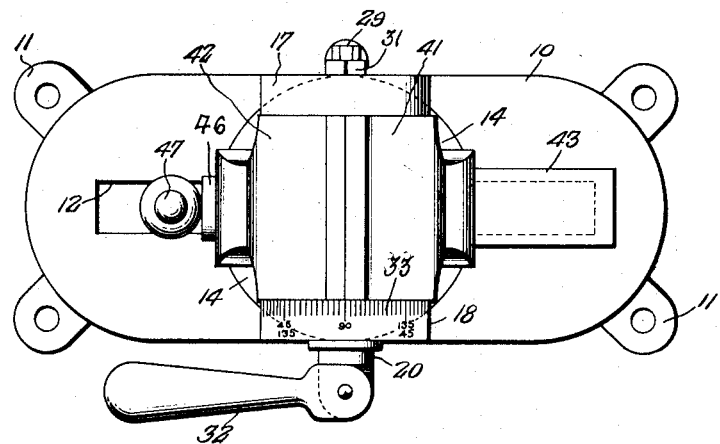
Fig. 2 is a plan view.

The improved device comprises an attachment to a vise, whereby the gripping jaws may be set to hold an article at any desired inclination, relative to a foundation member or support, the latter represented conventionally at 10 and provided with means, such as perforated ears 11, for attaching to a supporting structure, such as a work bench or the like, not shown.

The member 10 is likewise formed with a longitudinal guide slot 12, undercut as shown at 13.

Bearing rotatively upon the foundation member 10 is a base plate 14 having a central aperture to receive a center stud or pin 15 formed with a lateral enlargement 16 to engage the undercut portions 13 of the guide slot and with its upper portion extended above the upper face of the base member 14 and threaded at the upper end.

The pin 15 is flattened where it passes through the guideway 12 so that the pin in the guideway will freely slide but will not rotate therein.

Rising from the base plate 14 at opposite sides, are ears or lugs 17 and 18 perforated to rotatively receive threaded studs 19 and 20.

Attached to or formed integral with the plate 14 is a stationary bearing member 21 having an outwardly and upwardly inclined segmental or beveled face, indicated at 22. Pivoted at 23 to the plate 14 is a locking member 24 similar in shape to the member 21 and having an outwardly and upwardly inclined or beveled segmental face 25 as shown more clearly in Fig. 6 which represents the member 24, detached.

Rigidly attached to the upper threaded end of the stud 15 is a disk 26 having its periphery beveled to engage the beveled faces 22 and 25 of the portions 21 and 24.

The disk 26 bears upon the upper face of the base 14 and is formed with a threaded aperture to engage the threaded part of the stud 15, and is secured from rotating on the stud by a key member 27 engaging the threads.

Tapped through the ear or lug member 17 is a set screw 28, to bear against the member 24, and clamp the latter against the disk 26, as shown in Fig. 3. By this arrangement the member 14 and its attachments is rotative on the base member 10 and movable longitudinally in the slot 12, and may be firmly clamped in adjusted position through the medium of the swinging clamp member 24 and set screw 28.

The set screw 28 is preferably provided with a swinging operating lever or handle 29.

Fitting between the lugs 17 and 18 is a cylindrical member 30 provided with a threaded central aperture to receive the threaded studs 19 and 20, as shown in Fig. 3.

The stud 19 is provided with a wrench receiving lug 31 while the stud 20 is provided with a pivoted turning handle or lever 32.

By this arrangement the member 30 may be rotatively supported between the lugs 17 and 18 and clamped in adjusted position.

The upper portion of the ears or lugs 17 and 18 are semi-circular and conform to the periphery of the member 30 so that the outer face of the member 30 conforms constantly to the curvature of the ears.

The confronting faces of the members 18 and 30 are roughened or serrated, as shown, to insure the positive grip between parts when the members 18 and 30 are actuated.

The curved face of one of the ears or lugs, for instance the member 18 is graduated in degrees as indicated at 33, while the contiguous portion of the member 30 is likewise provided with degree indicating graduations shown at 34. By this means the degree of angularity or inclination at which the member 30 is adjusted may be ascertained. The numerals indicating the degrees will also be preferably stamped upon the member 18, as shown.

Formed upon or integral with the member 30 is a cheek member 35 disposed at right angles to the member 30 and with its inner face in vertical alinement with the axis of the member 30 and the studs 19 and 20. The member 35 is provided with a relatively large aperture to receive an internally threaded sleeve 36 the latter having a laterally directed stop flange or head 37.

A threaded bolt 38 engages the threaded sleeve 36 and is provided with a stop flange or collar 39 and a swinging operating handle 40.

The vise portion of the improved device comprises a stationary jaw 41 and a movable jaw 42, the movable jaw having a guide bar 43 slidable through the movable jaw.

The bar 43 is formed with a downwardly opening longitudinally directed cavity, and rising from the body of the stationary jaw is an internally threaded projection 44 which fills the cavity of the bar 43 as shown in Fig. 3.

Mounted for rotation in the movable jaw 42 is an operating screw 45 with the threads thereof engaging the threaded projection 44 of the jaw 41.

The screw 45 is formed with an outer stop collar 46 and an operating handle 17 and with an inner stop collar 48. By this means the screw member is rotative in the movable jaw and operates to move the jaw 42 toward and away from the stationary jaw 41.

Depending from the stationary jaw 41 is a cheek member 49, corresponding to and bearing against the cheek member 35. The member 49 is formed with a relatively large aperture to rotatively engage the sleeve 36 and engaged by the stop collar 39 of the clamp bolt 45 as shown in Fig. 1.

The confronting faces of the members 35 and 49 are roughened or serrated to increase the grip between the parts when the clamp screw 45 is actuated.

The sleeve 37 is provided with a stop key 50 fitting in a corresponding seat in the member 35 to hold the sleeve from rotation therein.

The member 35 is provided with graduations in degrees of a circle, as indicated at 51, while the member 49 is provided with corresponding graduations. By this means the degree of angularity at which the jaws of the vise are adjusted may be ascertained. The numerals indicating the degrees are also stamped upon the member 35 as shown. The jaws of the vise may thus be adjusted to hold an article at any desired angle or inclination to hold the article in convenient position for the workman.

The improved device is simple in construction, can be manufactured in any required size or of any suitable material, and may be readily adapted for holding large or small articles, for instance the device may be made in small sizes for the use of jewelers, watch makers, or the like, or for larger articles in machine shops, garages, and the like.

The device may be attached to a work bench, for hand work or to the bed of a drill press, or the like to hold a piece of work while being drilled.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:—

1. In an apparatus of the class described, a foundation member having a longitudinal guide slot, a base member rotative on the foundation member, means for clamping the base member in adjusted position on the foundation member, perforated lugs rising from the base member, a cylindrical member disposed for rotation between the spaced lugs, means for clamping the cylindrical member between the lugs, a cheek member rising from the cylindrical member, a vise device including a stationary jaw and a movable jaw, a cheek member depending from the stationary vise jaw and bearing against the cheek member of the cylindrical member, and means for clamping the cheek members in adjusted position.

2. In an apparatus of the class described, a base member adapted to be mounted for rotation and having perforated lugs rising therefrom in spaced relation, a cylindrical member disposed for rotation between the spaced lugs, means for clamping the cylindrical member between the lugs, a cheek member rising from the cylindrical member, a vise device including a stationary jaw and a movable jaw, a cheek member depending from the stationary vise jaw and bearing against the cheek member of the cylindrical member, and means for clamping the cheek members in adjusted position.

3. In an apparatus of the class described, a support, a cheek member swingingly supported relatively to said support, a vise including a stationary jaw and a movable jaw, an opposing cheek member depending from said stationary jaw and bearing against the swinging cheek member, means for clamping the cylindrical member and the lugs in adjusted position, and means for clamping the contacting cheek members in adjusted position.

4. In an apparatus of the class described, a support, a cheek member swingingly supported relatively to said support and having a sleeve extending therefrom, a vise including a stationary jaw and a movable jaw, an opposing cheek member depending from said stationary jaw and bearing against the swinging cheek member and rotatively engaging the sleeve, means for clamping the cylindrical member and the lugs in adjusted position, and means for clamping the contacting cheek members in adjusted position upon the sleeve.

5. In an apparatus of the class described a support, a cheek member swingingly supported relative to said support, a vise including a stationary jaw and a movable jaw, an opposing cheek member depending from said stationary jaw and bearing against the swinging cheek member, said cheek members and lugs having coöperating graduations to denote the angular position of the vise jaws, means for clamping the cylindrical member and the lugs in adjusted position, and means for clamping the contacting cheek members in adjusted position upon the sleeve.

6. In an apparatus of the class described, a foundation member having a longitudinal guide slot, a vise device including a base portion rotative on the foundation and having a bearing member formed with a beveled segmental face, a stud extending through the slot of the foundation member and formed with a laterally extended lower end operating to prevent upward displacement of the stud, a stop disk carried by the stud and having a beveled periphery in constant engagement with the beveled segmental face of the bearing member, a locking member swinging upon the base and having a segmental beveled portion to engage the beveled periphery of the disk, and means for applying pressure to the swinging member.

In testimony whereof we affix our signatures hereto.

OTTO L. ENGSTROM.
HERMAN C. NELSON.